United States Patent [19]

Amoretti

[11] Patent Number: 4,568,046

[45] Date of Patent: Feb. 4, 1986

[54] STOP AND GUIDE BARRIER FOR AIRCRAFT

[75] Inventor: Jean B. Amoretti, Pomponne, France

[73] Assignee: Societe Anonyme UGEC, France

[21] Appl. No.: 572,238

[22] Filed: Jan. 20, 1984

[30] Foreign Application Priority Data

Jan. 24, 1983 [FR] France .............................. 83 00981

[51] Int. Cl.[4] .............................................. B64G 1/18
[52] U.S. Cl. .................................. 244/114 R; 340/958
[58] Field of Search .................. 244/114 R, 115, 116, 244/161; 340/958, 51; 364/439

[56]     References Cited
U.S. PATENT DOCUMENTS

| | | | |
|---|---|---|---|
| 2,842,876 | 7/1958 | Chicoine et al. | 340/51 |
| 3,003,451 | 10/1961 | Lundin et al. | 244/114 R |
| 3,487,553 | 1/1970 | Stingl | 114/261 |
| 3,626,884 | 12/1971 | Annibale | 114/261 |
| 3,674,226 | 7/1972 | Wasson | 244/114 R |
| 3,690,599 | 9/1972 | Hager | 244/114 R |
| 3,729,262 | 4/1973 | Snead et. al. | 244/114 R |
| 4,236,686 | 12/1980 | Barthelme et al. | 244/116 |
| 4,249,159 | 2/1981 | Stasko | 340/958 |

Primary Examiner—Galen L. Barefoot
Attorney, Agent, or Firm—Steele, Gould & Fried

[57] ABSTRACT

A stop and guide barrier for parking aircraft has a stop carrying a guide pattern against which the windscreen of an aircraft must be brought. The barrier is formed from several elements mounted end to end and hinged to each other, the stop mounted as an extension of one of the endmost elements. The opposite endmost element is received in a support structure. The barrier has a first assembly of elements adapted to allow movement of the stop in three dimensions and a second assembly of actuators provided for selectively actuating the first assembly as a function of the particular characteristics of the aircraft that is expected.

17 Claims, 8 Drawing Figures

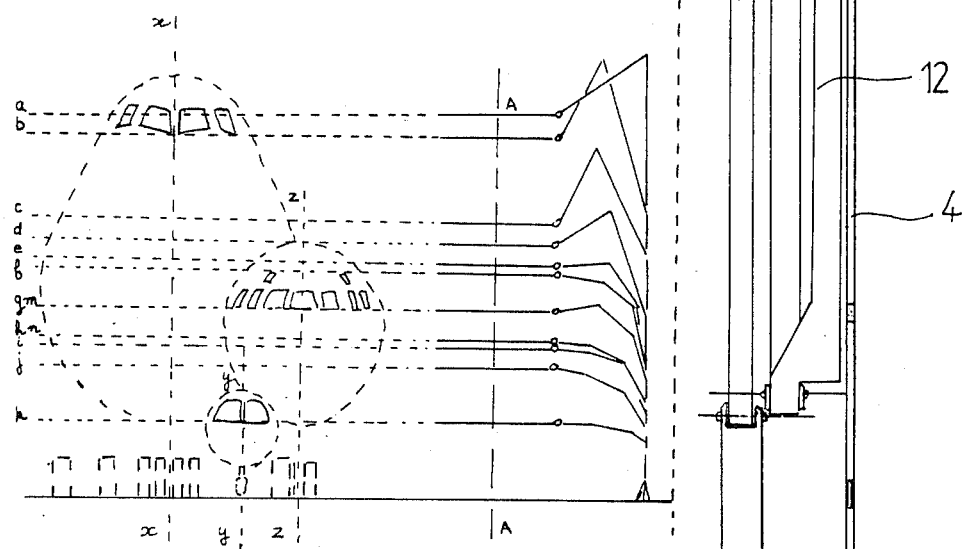
FIG 4
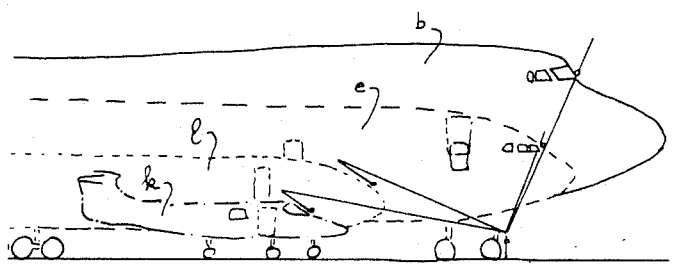
FIG 5
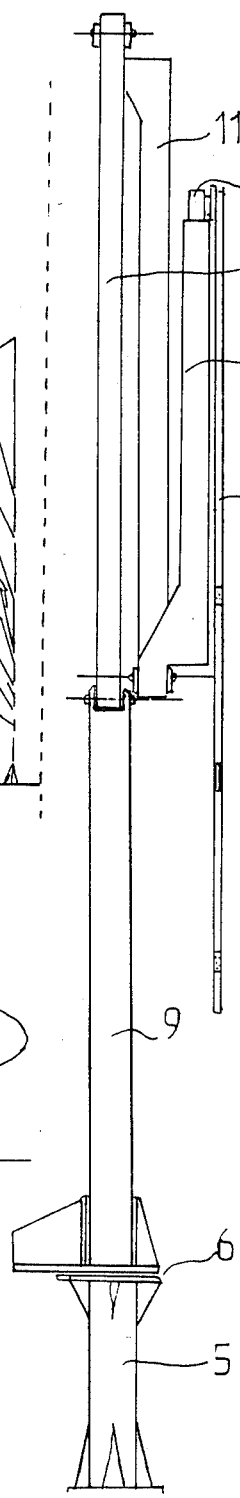

STOP AND GUIDE BARRIER FOR AIRCRAFT

BACKGROUND OF THE INVENTION

1. Field of the Invention

The present invention relates to a stop and guide barrier for aircraft, of the type compirising a stop carrying a guide pattern and against which must be brought the windscreen of the cockpit of an aircraft coming into position at right angles to a gangway for disembarking passengers or at a precise point on an aeronautical platform.

2. Prior Art

The technique generally used for guiding aircraft on the ground in the vicinity of the debarkation zone for passengers in which a technician, generally called a "batman" or "signalman", stands in front of the aircraft and makes conventional signs to the pilot, does not today give satisfaction because it is not accurate enough. This lack of accuracy was acceptable when airports were not overloaded. At the present time, however, when traffic has greatly increased, the parking conditions must be such that there is no wasted space in the vicinity of the terminals and such that debarkation of the passengers takes place as quickly as possible.

To this end, efforts are now made to bring the aircraft alongside the terminals with an accuracy such that their door or doors come exactly opposite the opening of the pre-gangways with concertina walls dependant on fixed buildings. This stopping accuracy is obtained by optically guiding the aircraft whereby a barrier is provided comprising a stop carrying a guide pattern and against which the pilot must bring the windscreen of the cabin of his aircraft.

The problem with this type of guiding is the positioning of the stop. In fact, its position must be very variable so as to take into account the height of the aircraft, the distance between its windscreen and its door and the distance between the pre-gangway and the longitudinal axis of the plane-from one aircraft to another there may be differences reaching 18 meters in length and 10 meters in height.

At the present time, to solve this problem, either a technician manually adjusts the position of the barrier for each aircraft announced, depending on the type of aircraft and the risks of operating errors which that comprises, or a particular type of aircraft is assigned to a particular pre-gangway equipped with a permanently adjusted barrier, which avoids having to change the adjustment but sometimes ties up a pre-gangway needlessly.

SUMMARY OF THE INVENTION

The aim of the present invention is to overcome one or more of these disadvantages. A barrier is provided formed of several elements mounted end to end and hinged to each other, one of the endmost elements being extended by the stop carrying the guide pattern and the opposite endmost element being received in a support structure. The barrier further comprises a first assembly of means adapted to allow movement of the stop in three dimensions and a second assembly of means being provided for selectively actuating the first assembly of means depending on the particular characteristics of the aircraft expected.

More particularly, the first assembly of means is adapted to allow rotation of the barrier about an axis perpendicular to the plane on which the support structure rests, pivoting thereof on each side of a vertical axis in a plane parallel to the longiudinal axis of the aircraft and extension or retraction of its elements with respect to each other.

The combination of the rotational, pivotal and extension movements of the barrier allows the stop carrying the guide pattern to be brought exactly in the position where the windscreen of the expected aircraft is to be placed, whatever the type of aircraft, so that the door of the latter is exactly opposite the opening of the concertina vestibule of the pre-gangway, or of the scheduled debarkation point.

In one embodiment of the invention, the means belonging to the first assembly allowing rotation of the barrier comprises an orientation ring interposed between the support structure and the endmost element opposite that which carries the stop.

Preferably, this orientation ring allows rotation through 180°, a greater angle being pointless.

As for the means belonging to the first group and allowing respectively a pivoting movement of the barrier and the extension and retraction of the elements with respect to each other, they may be formed by any actuating member with reversible action, such as a cylinder and piston arrangement or a ball joint driven by an electric motor with step down means.

Advantageously, the barrier may pivot through 90° on each side of the vertical axis, which gives a range of 180°.

In a preferred embodiment, the barrier is in the form of a finger whose elements form phalanges, a term used to denote the bones of the fingers and toes. The extension and retraction movements of the barrier are, in this case, similar to those of a finger.

So as to maintain the efficiency of the guide pattern, the stop is mounted on the endmost element from which it depends through a device ensuring that his stop is held in the horizontal position, whatever the position of the elements of the barrier. Any number of such leveling devices are known in the art, and do not form a part of this invention in and of themselves.

It is advantageous if the final approach of the aircraft can be made not only by the pilot but also by the co-pilot and, for this, the stop carries a double guide pattern, as known in the art, correcting the parallax error caused by the spacing between the seats of the pilot and co-pilot and consequently between the observation points of the guide patterns, which are variable depending on the type of aircraft. To take into account this variable spacing, the first assembly of means of the invention comprise, preferably, means for varying the spacing between the guide patterns.

So as to adapt the barrier to the case of small aircraft which berth along the same longitudinal axis as the large aircraft, and whose cabin is thus further removed from the support structure of the barrier than that of the large aircraft, it is preferable for the endmost element, of which the stop forms an extension, to be telescopic.

The second assembly of means for selectively actuating the means of the first assembly depending on the particular characteristics of the aircraft expected is advantageously formed, on the one hand, by a servo-control which has stored in its memory the actuating conditions for each means of the first assembly (rotation, pivoting and extension of the elements of the barrier; spacing apart of the guide patterns) as a function of each type of aircraft and, on the other hand, by a central post under the control of this servo-control and adapted to act on the means of the first assembly.

The operating principle of the whole is that, when the servo-control receives an order corresponding to a type of aircraft, it acts accordingly on the central post so that the central post brings the stop carrying the guide pattern into the desired position. Safety devices are of course provided which will be described briefly further on.

To prevent having to maintain the orientation of the guide pattern constant so that the useful part of the pattern is always exposed to the view of the pilot and the co-pilot, it is advantageous for this pattern to be cylindrical and for the useful part of this pattern to occupy the whole periphery thereof.

BRIEF DESCRIPTION OF THE DRAWINGS

One embodiment of the invention is described hereafter by way of non-limiting example with reference to the accompanying drawings in which:

FIG. 3 is a side view of the barrier in the inoperative position;

FIGS. 4 and 5 are schematic views respectively from the front and from the side of different sized aircraft berthed alongside a building, also showing the front evolution sectors for each type of aircraft;

DETAILED DESCRIPTION OF THE PREFERRED EMBODIMENTS

Figure 1:
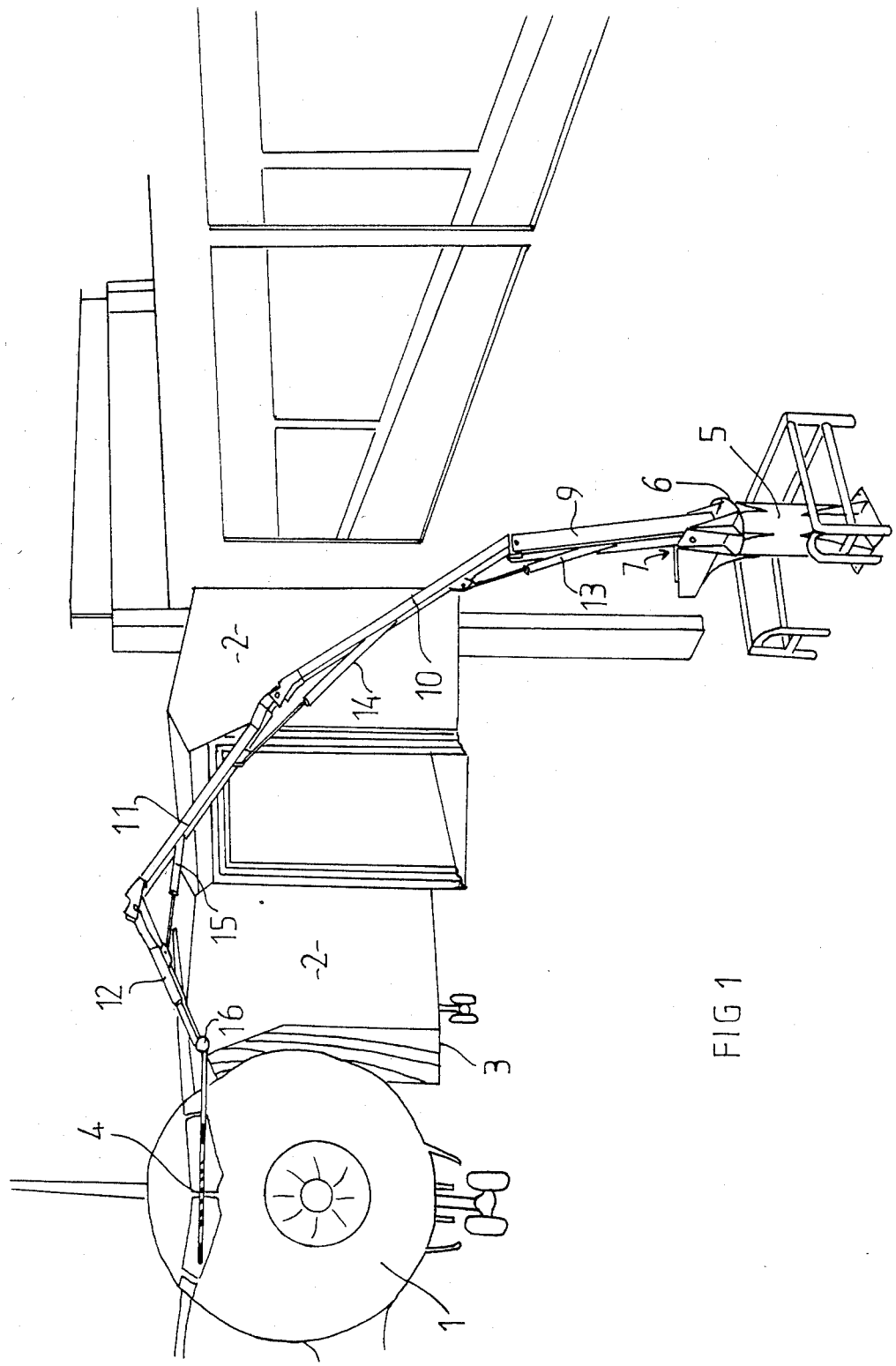
FIGS. 1 and 2 are respectively perspective front and ¾ views of an aircraft guided by and stopped adjacent a barrier in accordance with the invention.
Figure 2:
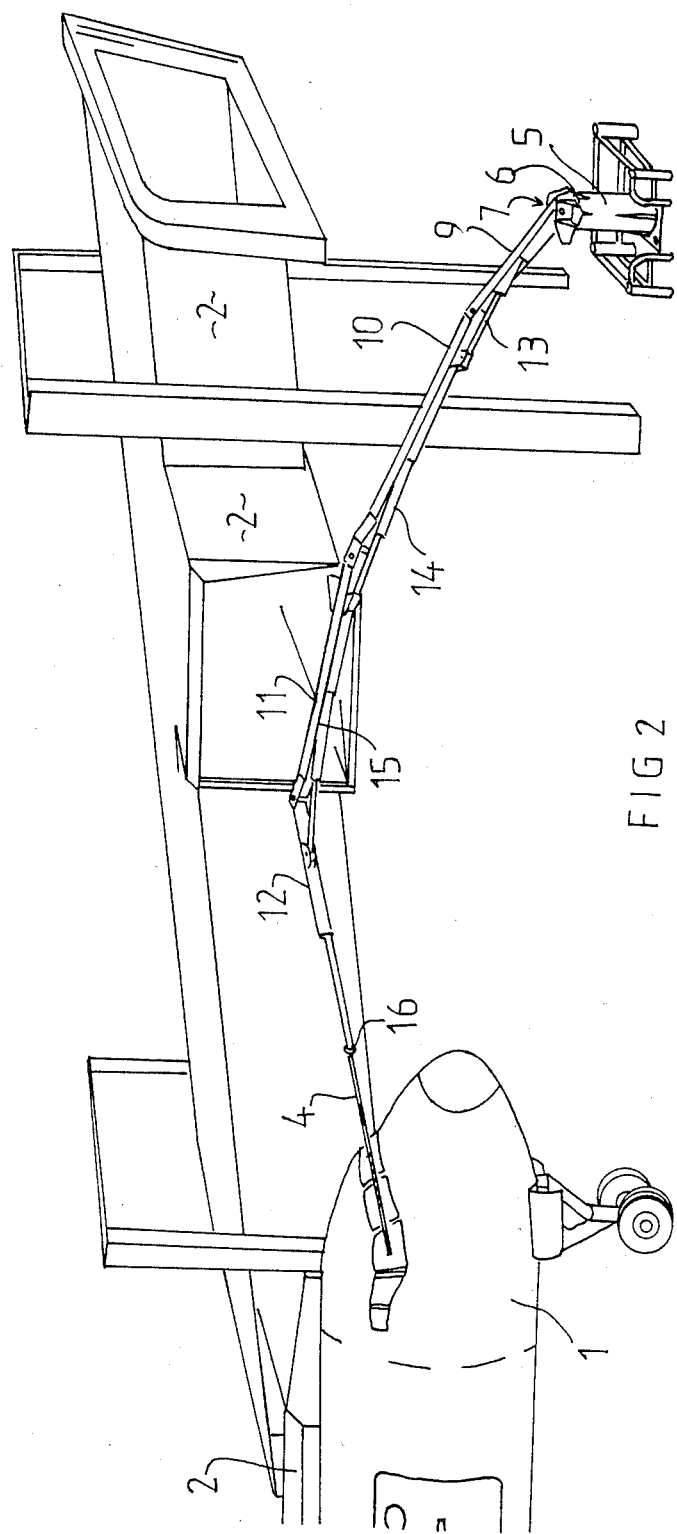

Referring to FIGS. 1 and 2, an aircraft 1 can be seen stopped alongside a fixed building comprising two pre-gangways 2 one of which is opposite the door (not visible in the Figure) of the aircraft and connected to this door by a concertina vestibule 3. The windscreen of the cabin of the aircraft is in abutment against a stop 4 made from a light alloy or fibers carrying a double guide pattern with variable spacing and which depends from the barrier of the invention.

Preferably, the double pattern is cylindrical and its useful surface extends over the whole of its periphery which avoids having to maintain its orientation such that its useful surface is always suitably directed towards the pilot and the co-pilot of the expected aircraft.

Figures 6, 7:
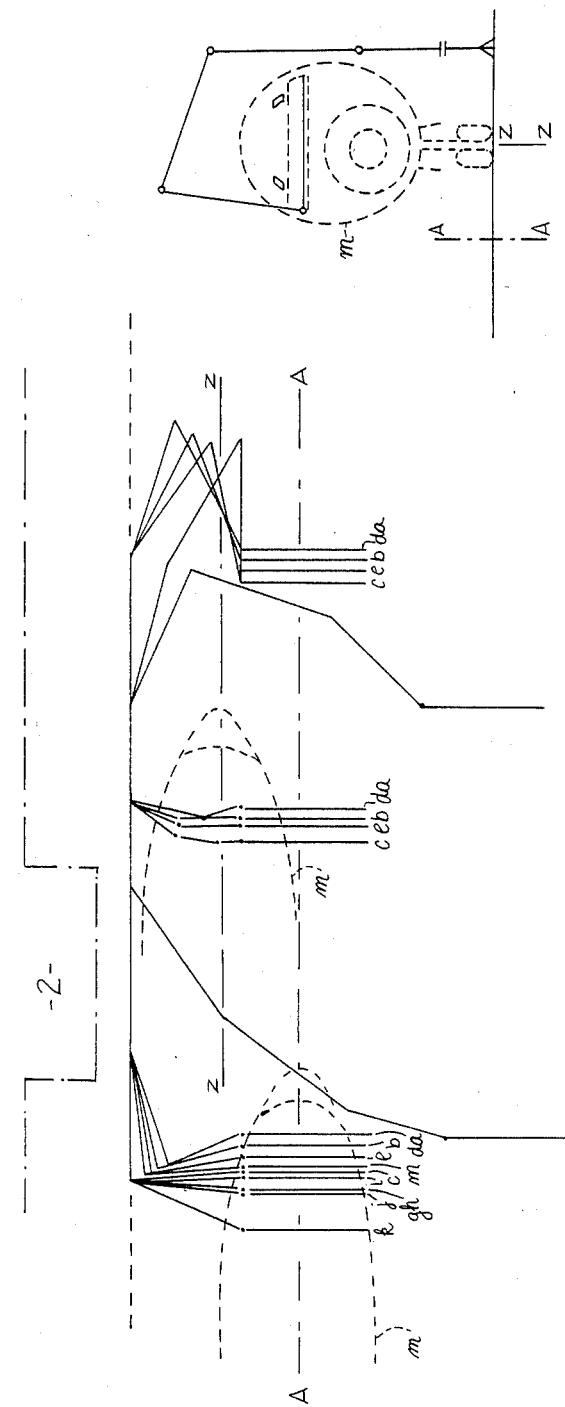
FIG. 6 is a schematic view of the barrier in the operative position for guiding and stopping a DC8 coming to berth along an axis offset with respect to the aircraft axis.
FIG. 7 shows the top evolution sectors for each type of aircraft.
Figure 8:
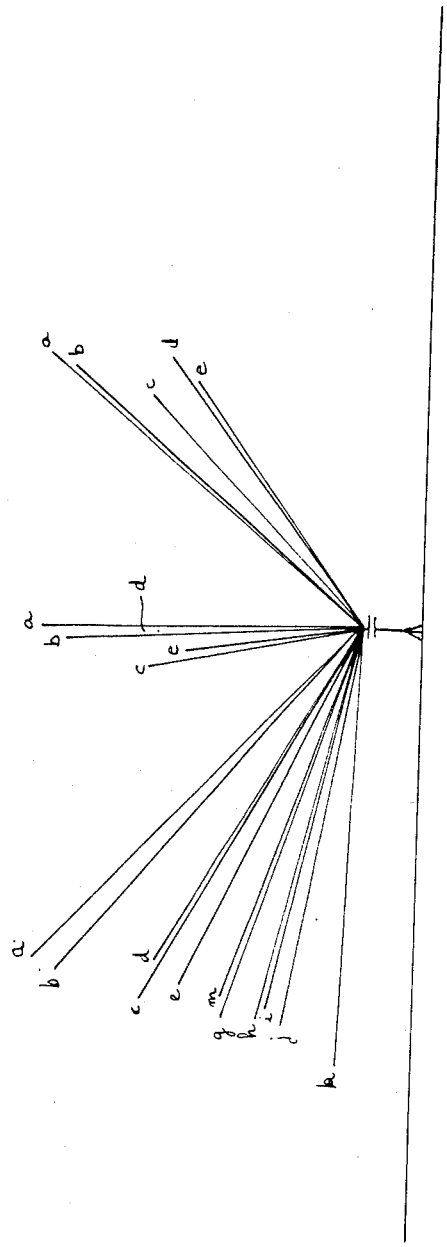
FIG. 8 shows the side evolution sectors for each type of aircraft.

As can be clearly seen in FIGS. 4, 5 and 7, stop 4 occupies a quite different position depending on the type of aircraft.

The barrier of the invention will now be described in detail, with numbers corresponding to like elements in the respective Figures:

Its base is formed by a steel column 5 provided with reinforcing pieces and whose height depends on the location where it is placed with respect to the pre-gangways 2. On the upper part of this column 5 is provided a plate having rack wheels or an orientation ring 6 which allows the whole of the barrier to rotate through 180°.

Between the lower endmost element 9 of the barrier and this orientation ring 6 is disposed a tilting device 7 situated between two flanges provided with stiffeners having a shape similar to that of the turret of a tank, and which is formed by a piston and cylinder arrangement whose end acts on cams with suitable camming surface. This device allows the barrier to tilt or pivot on each side of the vertical axis through an angle of 90°, that is to say, 180° in all, in a plane parallel to the longitudinal axis of the aircraft.

The barrier properly speaking has the form of a finger with four phalanges, segments or elements 9, 10, 11 and 12 made from steel or light alloy mounted end to end and hinged to each other. Disposed across each hinge there is provided a hydraulic cylinder, respectively 13, 14 and 15, bearing on the adjacent ends of each adjacent pair of phalanges, segments or elements.

By way of example, the first phalange, segment or element has a length of two meters, the second 3.60 meters, the third 3.50 meters, and the fourth, which is, telescopic a length varying between 2 meters and 3.50 meters.

The 2nd, 3rd and 4th phalanges, segments or elements work in planes perpendicular to the longitudinal axis of the aircraft.

Stop 4 is an extension of the 4th phalange, segment or element 12. Stop 4 is mounted on the segment or phalange by means of a ring gear 16 which ensures that the stop 4 is always parallel to the ground, i.e. parallel to the axis of the cabin of the aircraft, whatever the position of the elements of the barrier.

For more compact folding up of the barrier, when it is not in use, the 3rd and 4th segments are not aligned with the other two.

The inoperative position of the device can be clearly seen in FIG. 3.

A separate control device is provided for the barrier of the invention, which device comprises a central hydraulic post and a servo-control. The principle of this will be described in connection with the operation of the barrier.

With the barrier in the inoperative position mentioned earlier, when an airrcraft is announced on the arrival and departure board, a contact ie created at the level of the logic and the corresponding data passes through a comparator whose role is to determine if the data in question is exact or not, before they are translated into orders acting on the central hydraulic post and so causing unfolding of the barrier.

Thus, for example, if an airbus 310 is announced and if the information displayed is A 309 instead of A 310, the comparator, after analysing the erroneous message, cancels it and, by return, lights an "error" indicator light.

If the display is correct, the comparator gives the necessary orders to the servo-control which, on the one hand, acts on the central hydraulic unit for unfolding the barrier and, on the other hand, triggers off a search sequence for locating stop 4 in the desired position and for spacing apart the guide patterns by the desired amount; this spacing can be obtained by means of a cylinder acting on a system of telescopic tubes.

The barrier unfolds as follows: the assembly formed by stop 4 and the fourth and third segments or elements 11 and 12 pivots as a block on the end of the second segment or element 10. The fourth segment or element 12 and stop 4 then pivot together on the end of the third segment or element 11 and, finally, stop 4 pivots on the end of the fourth segment or element 12.

Should a leak occur in the hydraulic circuit, so as to prevent the barrier from changing position once the stop has been correctly positioned, or for correcting it, a safety system is provided which either compensates for minor leaks, or triggers a "danger" signal if the leak cannot be compensated for.

When the stop occupies the desired position, contacts provided on the barrier feed information to the comparator which, after analysis, accepts or refuses the positioning. If the positioning is refused, the comparator sends the necessary information for correcting the positioning to the servo-control and the cycle is repeated.

When the positioning operation is finished the aircraft may come to berth alongside the building. The guide pattern system provided on stop 4 allows the pilot as well as the co-pilot to align the aircraft and to cause it to advance until the cabin thereof comes into contact with the stop 4.

Once the passengers have left the aircraft and once the latter has moved away from the debarkation zone, it is sufficient to press an "acquittal" button to wipe out all the data. The comparator sends out the required information for returning the barrier to the inoperative position, following a folding up sequence which is the reverse of the folding out sequence.

FIGS. 4, 5, 7 and 8 show different possible positions of the barrier as a function of the type of aircraft. In these Figures, these aircraft are identified as follows:
  a: C 5 A
  b: 747
  c: DC 10
  d: L 1011
  e: A3B
  f: 767
  g: 707
  h: 727
  i: 737
  j: BAC 111
  k: Learjet
  l: caravelle
  m: DC 8
  n: DC 9

As can be seen in FIGS. 4 and 7, with the invention it is possible to berth the aircraft along the axis x—x, y—y, and z—z, which are offset with respect to the axis of the aircraft. A—A along which all the aircraft are positioned at the present time whatever their size. It is thus possible to reduce the length of the concertina vestibules equipping the pre-gangways.

By way of example, the front position of the barrier in the case of a DC 8 berthed along the offset axis z—z is shown in FIG. 6.

It will be readily understood that the present invention is not limited to the embodiment described and shown. In particular, the support structure need not be fixed to the ground but may instead be fixed, for example, to a pre-gangway, in which case column 5 would be omitted if necessary, since it only plays a height compensating role.

Finally, instead of the hydraulic controls used in the embodiment shown in the drawings, any other appropriate means could be used, for example mechanical or pneumatic jacks or cylinders, or electric motors.

I claim:

1. A stop and guide barrier for correctly positioning any of a plurality of different types of aircraft in a parking area at a characteristic predetermined position and orientation relative to a pre-gangway position, each of the types having a characteristic height, a characteristic distance between the windscreen and the passenger door and a characteristic clearance distance between the longitudinal axis of the aircraft and the pre-gangway position, the barrier comprising:
  a stop bearing only a guide pattern means, against which guide pattern means a portion of an aircraft can be taxied, the guide pattern marking characteristic spatial coordinates which automatically place the aircraft in said predetermined position and orientation when the portion is brought into alignment with the guide pattern means;
  a first assembly of means for moving said stop in three dimensions, said first assembly having a plurality of controllable elements mounted end to end and controllably hinged to each other;
  a second assembly means for moving said stop in three dimensions, said second assembly having means for selectively actuating said elements of said first assembly to move relative to one another; and,
  a support structure for the first and second assemblies adapted to receive one endmost element of said first assembly, said stop being mounted to the opposite endmost element and forming a distal end of said barrier whereby said means for selectively actuating said elements of said first assembly are operable to position said elements and said stop in accordance with said typical characteristics of an expected aircraft so that said expected aircraft may be guided to said predetermined position and orientation.

2. The stop and guide barrier of claim 1, further comprising:
  means for rotating the barrier about a vertical axis defined by said support structure, the barrier being pivotable on each side of the vertical axis in a plane parallel to the longitudinal axis of the expected aircraft; and,
  means for controllably extending and retracting said elements of said first assembly with respect to one other.

3. The stop and guide barrier of claim 2, wherein said means for rotating said barrier comprises an orientation ring interposed between said support structure and said endmost element received by said support structure.

4. The stop and guide barrier of claim 2, wherein said means for pivoting the barrier and said means for extending and retracting said elements with respect to one other are actuating members with reversible action.

5. The stop and guide barrier of claim 1, wherein said barrier is in a form of an articulatable finger-simulating mechanism in which said elements correspond to phalanges of a finger.

6. The stop and guide barrier of claim 1, further comprising leveling means for said stop, mounted on said endmost element and operable for holding said stop horizontal regardless of the position of said elements.

7. The stop and guide barrier of claim 1, wherein said stop has a double guide pattern thereon, whereby the stop and guide barrier may be referenced by either of the pilot and copilot.

8. The stop and guide barrier of claim 7, further comprising means for varying the spacing between the double guide patterns.

9. The stop and guide barrier of claim 1, wherein said endmost element on which said stop is mounted is telescopic.

10. The stop and guide barrier of claim 1, wherein said means for actuating selectively said first assembly is comprises a servo-control.

11. The stop and guide barrier of claim 10, further comprising memory means for storing conditions for selectively actuating said servo-control, as a function of the characteristics of the expected aircraft.

12. The stop and guide barrier of claim 1, wherein said means for selectively actuating said first assembly comprises a central post under the control of a servo-control and which is adapted to act on said first assembly.

13. The stop and guide barrier of claim 1, wherein said guide pattern is cylindrical and its useful part extends over all of its periphery.

14. The stop and guide barrier of claim 1, wherein said guide pattern means comprises visibly perceptible indicia adapted for alignment with the wind screen of the expected aircraft.

15. The stop and guide barrier of claim 14, wherein said stop has a double guide pattern thereon, whereby the stop and guide barrier may be referenced by either of the pilot and copilot.

16. The stop and guide barrier of claim 1, wherein the elements of the first assembly are joined by hinges, and the elements are so movable as to enable at least one of the hinges to be positioned at levels both above and below at least one other of the hinges.

17. The stop and guide barrier of claim 1, wherein the first assembly comprises at least three elements.

* * * * *

UNITED STATES PATENT AND TRADEMARK OFFICE
CERTIFICATE OF CORRECTION

PATENT NO. : 4,568,046

DATED : Feb. 4, 1986

INVENTOR(S) : Jean B. Amoretti

It is certified that error appears in the above-identified patent and that said Letters Patent is hereby corrected as shown below:

Column 4, line 44, delete "ie" and insert —is— therefor.

Signed and Sealed this

Thirtieth Day of September 1986

[SEAL]

Attest:

DONALD J. QUIGG

Attesting Officer

Commissioner of Patents and Trademarks